Oct. 31, 1950  R. M. BERGER  2,527,787
KNUCKLE JOINT
Filed Feb. 27, 1948  2 Sheets-Sheet 1
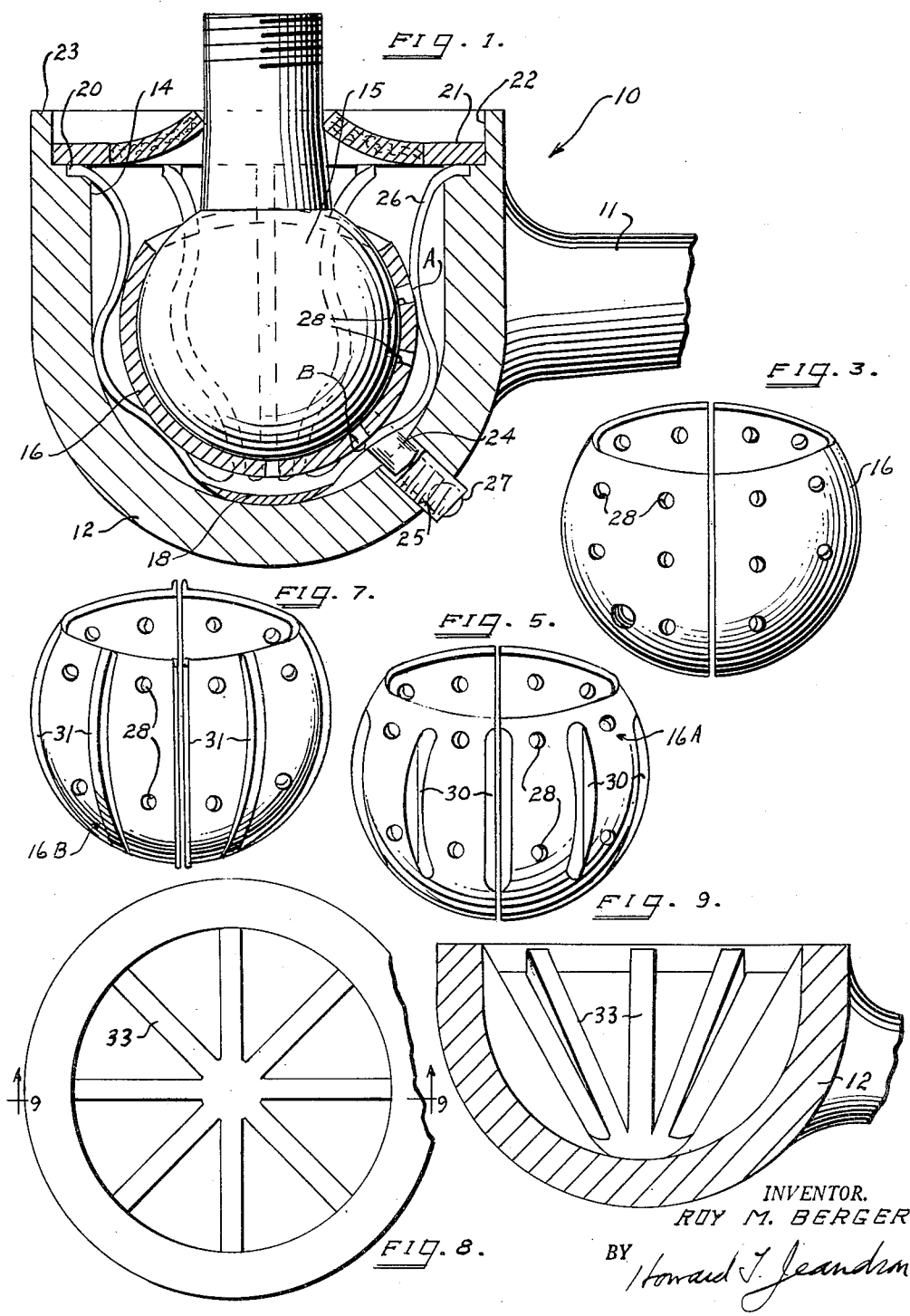
INVENTOR.
ROY M. BERGER
BY Howard T. Jeandron
ATTORNEY

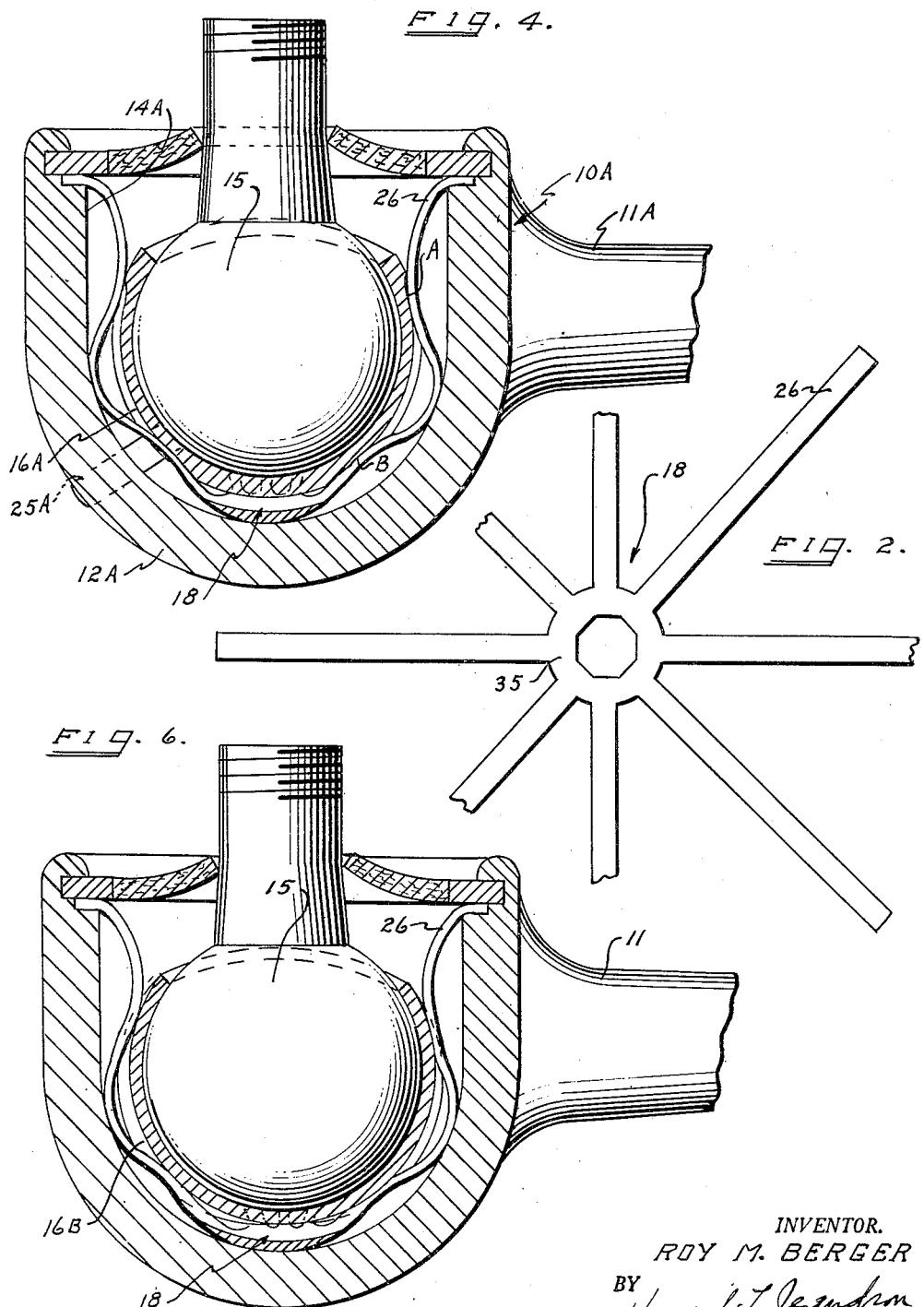

Patented Oct. 31, 1950

2,527,787

UNITED STATES PATENT OFFICE 2,527,787

KNUCKLE JOINT

Roy M. Berger, Brooklyn, N. Y., assignor to
Reuben Firestone, Brooklyn, N. Y.

Application February 27, 1948, Serial No. 11,601

4 Claims. (Cl. 287—90)

This invention relates to knuckle joint assemblies and more particularly to a ball and socket joint in which a cup shaped bushing supports the ball end in a floating position within the socket housing.

In accordance with this invention, a ball shaped rod end is rotatably mounted within a socket member and in addition the rod end is tiltably supported to digress a reasonable degree from the normal axis of the rod. The socket also supports a cage retainer of resilient material that is mounted between the cup shaped socket member and the supporting housing or any type of floatingly supported mounting that produces a degree of resiliency. The cage member is retained within the housing by a disc pressed against the lips of the cage retainer, these lips being mounted in a series of undercut portions or grooves in the housing; thus the cage retainer is locked in a predetermined position. A leather grease retainer is provided so that the joint may be packed with grease. The socket member is comprised of two halves to permit mounting about the ball end of the rod, and the cage member is affixed to the two socket members to retain the socket in a predetermined position within the housing. Thus the ball end of the rod is rotatable and tiltable within the socket, but in use the stresses to which the rod end must normally react are distributed through the cage mounting to diffuse the stresses into resultant forces depending upon the direction of the force transmitted. The cage mounting normally retains the cup shaped socket in a central position within the housing and when the ball end of the rod is mounted within this socket, it is packed with grease and rotates or tilts similarly to all other knuckle joints or rod end joints, but where most joints are provided with a set location or position this invention provides sufficient resiliency to permit the deviation of the ball end joint from its normal axis under a working stress.

Most of the prior art illustrates socket joints that become worn in an oval shape due to a continuous type of movement when the knuckle joint has been mounted in a mechanism for use in the normal mounting, such as a tie rod end, the knuckle joint moves back and forth in a predetermined pattern and therefore moves only in a certain pattern of rotation and tilting and thus tends to wear the joint following the contour of that movement, which is generally an oval shaped pattern. In this invention the ball end joint is supported in a cup shaped member that permits such a pattern of movement. Therefore, the only wear possible is around the periphery of the ball, which is normally packed with a lubricant, and the stresses are so distributed that the knuckle joint cannot wear on any other surface other than the interior of the cup shaped member.

An object of this invention is to provide a simple, strong, durable socket joint construction for a tie rod end.

A further object of this invention is to provide a knuckle joint construction comprised of a ball end socket in which the ball is floatingly supported within the knuckle joint and in which all stresses in operation are diffused evenly through the knuckle joint.

A still further object of this invention is to provide a resiliently supported socket joint wherein the socket is composed of two half members to enclose the ball end of a rod and in which the resilient supporting members retain the socket members in a set relationship with respect to the housing or supporting structure for the socket.

A still further object of this invention is to provide a spring supported cup shaped bushing within a knuckle joint housing, said bushing provided to enclose the ball shaped end of a rod and permit rotatable and tiltable movement within the bushing member.

Further objects of this invention shall be apparent by reference to the detailed description and the drawings in which—

Fig. 1 illustrates a cross sectional view of the knuckle joint,

Fig. 2 illustrates a plan view of the resilient cage structure before the resilient arms have been bent or shaped into their mounting formation as illustrated in Fig. 1, Fig. 3 illustrates a perspective view of the cup shaped retainer or bearing plate, Fig. 4 illustrates a cross sectional view of another embodiment of this invention, Fig. 5 illustrates a perspective view of the bearing plate utilized in Fig. 4, Fig. 6 illustrates a cross sectional view of a still further embodiment of this invention, Fig. 7 illustrates a perspective view of the bearing plate utilized in Fig. 6, Fig. 8 illustrates a plan view of another embodiment of the knuckle joint housing, and Fig. 9 illustrates a cross sectional view taken on line 9—9 of Fig. 8.

Referring to Fig. 1, there is illustrated a knuckle joint assembly 10 comprised of a rod 11 having a socket shaped end 12. The end 12 is provided with a socket or open ended aperture 14. A ball shaped rod end 15 is mounted within the aperture 14. The ball shaped end 15 is considerably smaller than the area of the socket shaped aperture 14. A cup shaped bearing plate or enclosing member 16 is provided to closely fit about the surface of the ball end 15. The member 16 may be provided in two or more sections (as illustrated in Fig. 1, it is provided in two halves). A resilient cage shaped member 18 is provided and is compressed into a tight fitting relationship between the interior of aperture 14 and the exterior of the bearing plate 16. The member 18 rests centrally at the center of the axis of the cup shaped aperture 14 and the plurality of extending portions of member 18 bear against the bearing plate 16 and other portions of the aperture 14, while the outer ends of the extending portions of member 18 are clamped in grooves or cut out portions 20 of the member 12 and are retained in this position by a disc 21 that is fitted into an aperture 22 of the member 12 and in its final assembly the extended lip portion 23 may be pressed or turned over onto the disc 21 to retain the whole structure into the assembled relationship illustrated in Fig. 1. I have shown member 18 clamped or held in a fixed position. A leather grease retainer is affixed to the central aperture of the disc 21 to provide a grease retaining means. Thus the member 18 will be held in the relationship illustrated and the spring arms 26 will be free to flex according to the stresses developed by the ball end joint in use. A locking pin 24 is provided and inserted through an aperture 25 of the housing 12. The locking pin 24 is secured to the bearing plate 16 to prevent its rotation or movement. A grease cup or valve 27 is inserted in the aperture 25. The bearing plates 16 are also provided with a plurality of apertures 28, so that the grease or lubricant may flow freely to all parts of the joint.

Referring to Fig. 2, member 18 is illustrated in a plan view, the member 18 being comprised of a plurality of resilient arms 26 that are commonly joined to a central member 35. The construction of member 18 may preferably be a composite unit stamped as such, or the extended arms 26 may be of a resilient material and all joined to the central member 35 by spot welding or otherwise in order to carry out the functioning of this member. In addition to the resiliency desired in the extending arms 26, in practice they must be formed or shaped as illustrated in Fig. 1 so that they will retain the bearing plate 16 in a snug fitting relationship about the ball end member 15. It may or may not be advisable to spot weld or affix the arms 26 at the bearing points A and B depending upon the amount of stress that is to be diffused by the compression of the arms 26 during the operation of the knuckle joint. However, with points A and B free to move, it is possible to impress a greater degree of compression on each and every arm 26 as the deformation of the arms under undue stresses naturally changes the configuration, flattening the arm and causing the points A and B to shift with relation to the member 16 but in the normal use of the knuckle joint, the stresses should not be beyond an anticipated degree and by affixing points A and B the member 16 will be retained in a definite relationship and the stresses become diffused to a greater degree. A locking pin 24 is mounted through the aperture 25 of member 12 and when affixed to the bearing plate 16, it will retain the plate in such a relationship that it may digress from the normal axis of the joint but it cannot rotate or change its relative relationship to the housing 12.

Referring to Fig. 4, there is illustrated another embodiment of the knuckle joint assembly 10A comprised of a rod 11A having a socket shaped end 12A. The end 12A is provided with a socket or open ended aperture 14A. A ball shaped rod end 15 is mounted within the aperture 14A. The ball shaped end 15 is somewhat smaller than the area of the socket shaped aperture 14A. A cup shaped bearing plate 16A is provided to closely fit about the surface of the ball end 15. The member 16A may be provided in two or more sections. A resilient cage shaped member 18 is provided and is compressed into a tight fitting relationship between the interior of the aperture 14A and the exterior of the bearing plate 16A. The member 16A is provided as illustrated in Fig. 5 with a plurality of cut out or indented portions 30 around its periphery. These are provided in spaced relationship so that the member 18 and especially the arms 26 will fit into these indentations at the points A and B. Thus when the member 18 and the bearing plate 16A are in the position illustrated in Fig. 4, the bearing plate 16A will be retained by the arms 26 to prevent rotation although permitting free movement by the ball end 15 within the member 16A.

Another variation of the construction of the knuckle joint is illustrated in Fig. 6, in which the same members are utilized, the variation being in the bearing plate and as illustrated in Fig. 6, the bearing plate 16B will be constructed as illustrated in Fig. 7. In this construction it will be noted that instead of indenting portions of the surface of the member 16B, I have provided ribs 31. Thus the member 18 as illustrated in Fig. 6 will be mounted so that the arms 26 rest against the bearing plate 16B between the rib formations 31. Thus in such construction the bearing plate 16B will be retained and prevented from rotating similarly to the construction illustrated in Fig. 4. It is apparent that the bearing plate 16B might similarly be constructed by cutting groove formations to approximate the width of the arms 26. Thus when the bearing plate is mounted as illustrated in Fig. 6, the arms 26 would snap into the groove formation of the bearing plate and also be locked at their ends to the housing and thus retain the bearing plate 16B to prevent rotation of same. It will be noted in Fig. 7 that where two halves are utilized the joining portion of the two halves may be so formed that they also form a pair of parallel ribs 31 and in mounting the bearing plate 16B, the parallel ribs 31 will remain in abutting relationship as shown, except that a slight clearance may be allowed to provide for a normal degree of wear.

Referring to Fig. 8, I have illustrated another embodiment of the knuckle joint housing illustrated in Fig. 1. In addition to the cup shaped aperture 14, I have provided a plurality of ribs 33 and as illustrated in Fig. 9, the ribs provide a dividing means permitting the arms 26 of the member 18 to be retained in a set relationship and to prevent rotational movement of the member 18 in the housing 12. It is to be noted that all bearing plates must be provided with grease apertures to allow a free flow of lubricant. Also in all embodiments of this invention, a grease cup must be provided in the housing 12. The locking pin 24 may be installed through the grease aperture 25 or it may be mounted through a special aperture 25A as shown in Fig. 4.

Although I have illustrated a cage shaped member 18 mounted within the socket aperture 14 to support the bearing plate 16, the invention does not necessarily exclude a variation in the configuration of arms 26. They may be shaped in any manner to produce a diffusion of the stresses involved and the number of arms 26 may be increased or decreased without departing from the spirit of this invention and so any resilient supporting structure may be incorporated in place of the cage shaped member 18 without departing from the general spirit of this invention. The member 18 as illustrated in this application is formed generally in the shape of an octopus, that is, the plurality of arms extending from a central body portion have been formed in a peculiar configuration which gives the appearance of the arms of an octopus and I have taken the liberty of drawing this comparison for a general descriptive term to be utilized in claiming my invention. Whether the member 18 is formed as illustrated or whether it is formed in a coil fashion or in any other configuration, the general purpose is to produce a floatingly mounted rod end joint in which the member 18 absorbs the stresses produced in the operation of the knuckle joint illustrated herein.

Other changes and modifications in the general structure may be made without departing from the spirit of this invention, and this invention shall be limited only by the appended claims.

What is claimed is:

1. A ball and socket joint comprising a stud having a ball end and a shank projecting therefrom, a hollow housing in which the interior walls have a spherical curvature, a bearing plate liner mounted within the housing and formed to define a ball socket for the ball end of the stud, said liner comprised of a plurality of segments, a resilient supporting element positioned within said housing and engaging both the interior spherical surface of said housing and the exterior spherical surface of said bearing plate liner, a locking disc to retain the resilient supporting element in a non-rotative relationship within the housing, and means to support the ball end of said stud in a resiliently supported position within said housing.

2. A ball and socket joint as defined in claim 1 wherein said liner is provided with a quantity of perforations spaced evenly around the liner and the housing is provided with a grease cup mounted in a perforation connected with the interior spherical surface, means to fill said socket joint with a lubricant, and means to provide a free flow of lubricant to the ball end of said stud.

3. A ball and socket joint comprising a stud having a ball end and a shank projecting therefrom, a hollow housing in which the interior walls have a spherical curvature, a bearing plate liner mounted within the housing and formed to define a ball socket for the ball end of the stud, said liner comprised of a plurality of segments, a resilient supporting element positioned within said housing and engaging both the interior spherical surface of said housing and the exterior spherical surface of said bearing plate liner, a locking disc to retain the resilient supporting element in a non-rotative relationship within the housing, said resilient supporting element comprised of a plurality of equally spaced arms radiating from a common center and supported in the cup of the housing, said arms of the resilient member supporting the said bearing plate, said arms of the resilient member being held at their ends in a fixed relation with the housing, means to retain said ball end of said stud within said ball shaped socket of the bearing plate when it is rotated, and means to retain said stud in a central position in said socket when it is moved a reasonable degree in any direction from its central axis.

4. A ball and socket joint as defined in claim 1 in which the resilient supporting element is in the form of distorted arms, a disc to lock said arms in a compressed formation between the bearing plate and the spherical interior of the housing, said arms being distorted in a configuration to produce a bearing contact with both the interior of the socket and the exterior of the bearing plate, and means to retain the stud end in said socket joint and absorb both compressive and tensional stresses with said resilient supporting member.

ROY M. BERGER.

REFERENCES CITED

The following references are of record in the file of this patent:

UNITED STATES PATENTS

| Number | Name | Date |
|---|---|---|
| 1,799,141 | Hufferd et al. | Mar. 31, 1931 |
| 1,908,789 | Ragan | May 16, 1933 |
| 2,096,557 | Peo | Oct. 19, 1937 |
| 2,189,266 | Klages | Feb. 6, 1940 |
| 2,424,431 | Booth | July 22, 1947 |

FOREIGN PATENTS

| Number | Country | Date |
|---|---|---|
| 845,318 | France | May 8, 1939 |